UNITED STATES PATENT OFFICE.

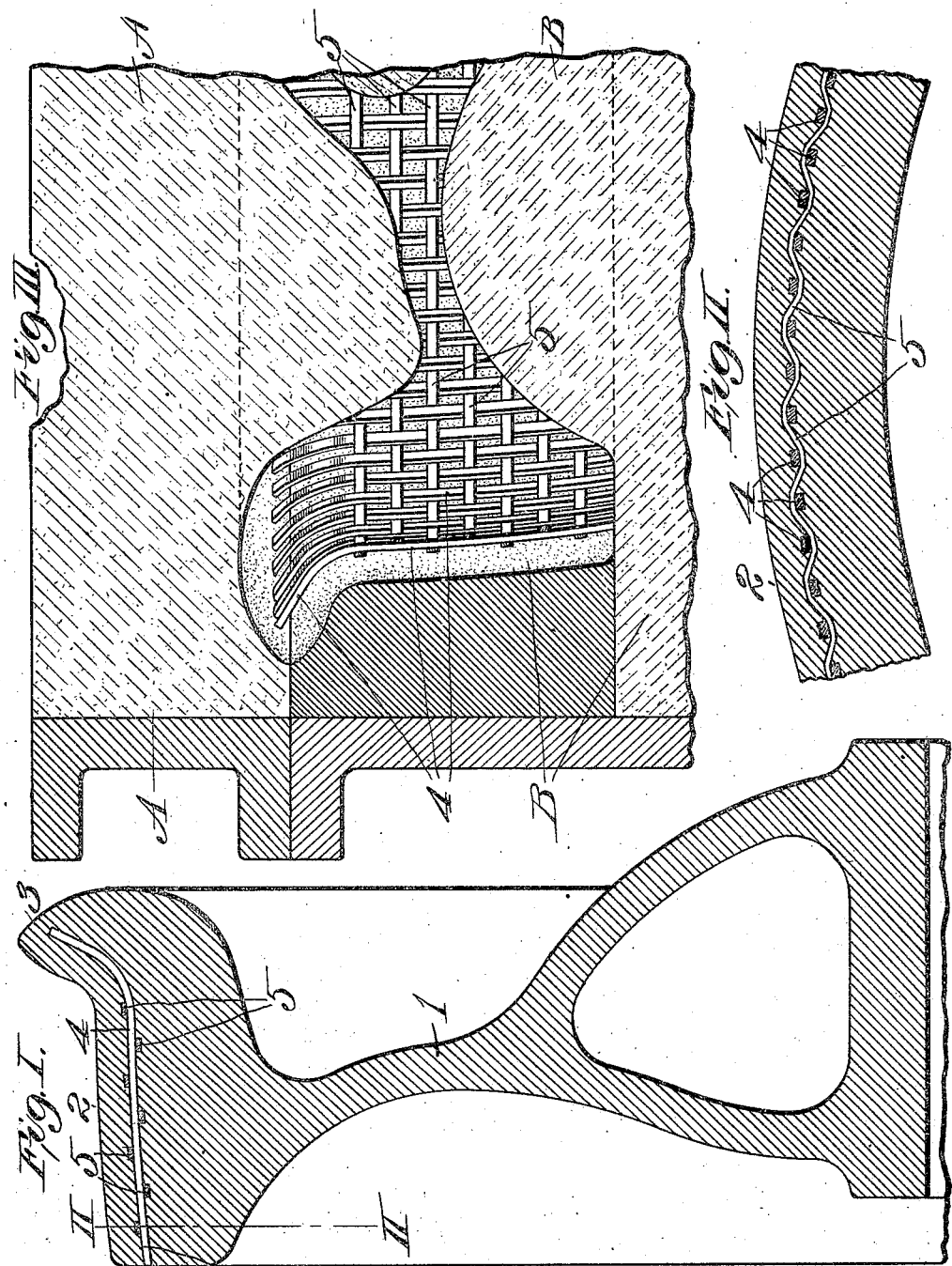

WILLIAM D. LOWRY, OF ST. LOUIS, MISSOURI.

CAR-WHEEL.

No. 891,494.

Specification of Letters Patent.

Patented June 23, 1908.

Application filed March 9, 1908. Serial No. 419,911.

*To all whom it may concern:*

Be it known that I, WILLIAM D. LOWRY, a citizen of the United States of America, residing in the city of St. Louis and State of Missouri, have invented certain new and useful Improvements in Car-Wheels, of which the following is a full, clear, and exact description, reference being had to the accompanying drawing, forming part of this specification.

A very great objection has existed in cast iron car wheels, due to the fact that they crack or break at the point where the flange of the wheel diverges from the tread, this being largely caused by the strain that is brought to bear on the flange as a car rounds a curve in a track and the flange is forced over against the rail.

The object of my invention is to make a car wheel which will have the usual characteristics of such a wheel, but will not be subject to this defect and to this end I insert within the wheel metallic strips of greater tensile strength than cast iron has, for instance strips of steel.

My invention consists in making a car wheel composed of cast iron with an insert that lies within the outer surface and which has a greater tensile strength than cast iron, these inserts extending across or substantially across the plane of the tread of the wheel and into the flange of the wheel.

Figure I is a detail section of my improved wheel. Fig. II is a section taken on line II—II, Fig. I. Fig. III is a detail view showing part of the cope and part of the drag of a mold with the insert in position.

1 represents the body of the wheel, 2 the tread, and 3 the flange.

A represents the cope, and B the drag of a mold in which my improved wheel may be cast.

The wheel is of the usual exterior conformation, but has an insert within the outer surface of the wheel, consisting of strips 4 of metal which are of greater tensile strength than cast iron, steel being the preferable metal used for these strips. The strips are located close together as shown in the drawings, and they extend across the tread of the wheel and into the flange, as shown in Fig. II. For the purpose of holding them together until the casting is made, I employ cross strips 5 which are interwoven with the strips 4 to hold the latter in position.

By the use of the strips 4, the flange of the wheel is so strengthened as to resist strain brought upon it by striking the rail of a track in rounding a curve or in the lateral vibration of a car, due to any cause, such as irregularities in the track.

Not only does my invention protect the breakage of wheels due to the flanges coming against the rails in rounding curves and in irregular tracks, but it also prevents the checking or breaking of the wheels at or about the point where the flange joins with the tread, due to unequal expansion caused by the heating of the tread of the wheels when the brakes are applied on long downgrades, which heat is of course, not applied to the flanges of the wheels with which the brake shoes do not come in contact.

While I have shown and described the insert as composed of strips, yet it is possible that it may be of some other form, such as a thin sheet (perforated or not) of steel or other metal having greater tensile strength than cast iron.

I claim:

1. As a new article of manufacture, a cast car wheel having an insert embedded within its flange and which extends into the tread of the wheel; said insert being composed of metal strips of greater tensile strength than the metal of which the body of the wheel is composed, substantially as set forth.

2. As a new article of manufacture, a cast car wheel having an insert embedded within its bearing surface and which is composed of metal strips which extend across the tread of the wheel and into the flange and which are of greater tensile strength than the body of the wheel, substantially as set forth.

3. As a new article of manufacture, a cast car wheel having an insert embedded in the flange and tread thereof and which is of greater tensile strength than the metal of which the body of the wheel is composed, substantially as set forth.

WM. D. LOWRY.

In presence of—
BLANCHE HOGAN,
HOWARD G. COOK.